(12) United States Patent
Fujioka et al.

(10) Patent No.: US 9,411,454 B2
(45) Date of Patent: Aug. 9, 2016

(54) DISPLAY DEVICE

(71) Applicant: Sharp Kabushiki Kaisha, Osaka-shi, Osaka (JP)

(72) Inventors: Akizumi Fujioka, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 14/382,025

(22) PCT Filed: Feb. 25, 2013

(86) PCT No.: PCT/JP2013/054805
§ 371 (c)(1),
(2) Date: Aug. 29, 2014

(87) PCT Pub. No.: WO2013/129333
PCT Pub. Date: Sep. 6, 2013

(65) Prior Publication Data
US 2015/0022476 A1    Jan. 22, 2015

(30) Foreign Application Priority Data

Mar. 2, 2012 (JP) .................................. 2012-047403

(51) Int. Cl.
*G06F 3/041* (2006.01)
*G06F 3/044* (2006.01)
*G09G 3/36* (2006.01)

(52) U.S. Cl.
CPC .............. *G06F 3/0412* (2013.01); *G06F 3/044* (2013.01); *G06F 3/0416* (2013.01); *G09G 3/3614* (2013.01); *G09G 3/3648* (2013.01); *G09G 3/3696* (2013.01)

(58) Field of Classification Search
CPC ..... G06F 3/0412; G06F 3/0416; G06F 3/044; G09G 3/3614; G09G 3/3648; G09G 3/3696
USPC ........ 345/173–179; 178/18.01–18.09; 349/12
See application file for complete search history.

(56) References Cited

U.S. PATENT DOCUMENTS 5,923,320 A * 7/1999 Murakami .............. G06F 3/044
345/173
6,229,528 B1 5/2001 Okajima et al.
(Continued)

FOREIGN PATENT DOCUMENTS

JP       09-090908 A    4/1997
JP       11-143635 A    5/1999
(Continued)

OTHER PUBLICATIONS

Official Communication issued in International Patent Application No. PCT/JP2013/054805, mailed on Mar. 26, 2013.

*Primary Examiner* — Amare Mengistu
*Assistant Examiner* — Stacy Khoo
(74) *Attorney, Agent, or Firm* — Keating & Bennett, LLP

(57) ABSTRACT

A display device (1) in accordance with the present invention includes a detection section (21) provided along a display panel (11) and detecting an approach or a contact of an object. The detection section (21) detects the approach or the contact of the object in a period which (i) is from a time point when supply of a scanning signal to a gate signal line (G) is started to a time point when supply of the scanning signal to a subsequent gate signal line (G) is started but (ii) excludes a rising period of a source signal supplied to a source signal line (S).

13 Claims, 11 Drawing Sheets

(56) References Cited

U.S. PATENT DOCUMENTS

| | | | |
|---|---|---|---|
| 2001/0015715 A1* | 8/2001 | Hebiguchi | G09G 3/3648 345/92 |
| 2001/0038370 A1 | 11/2001 | Yeung | |
| 2002/0041274 A1* | 4/2002 | Watanabe | G09G 3/3614 345/204 |
| 2010/0051936 A1* | 3/2010 | Hayashi | H01L 29/7869 257/43 |
| 2010/0110040 A1 | 5/2010 | Kim et al. | |
| 2010/0295833 A1 | 11/2010 | Nishio et al. | |
| 2010/0328274 A1 | 12/2010 | Noguchi et al. | |
| 2011/0037726 A1* | 2/2011 | Lee | G06F 3/0414 345/174 |

FOREIGN PATENT DOCUMENTS

| | | |
|---|---|---|
| JP | 2001-324706 A | 11/2001 |
| JP | 2009-216900 A | 9/2009 |
| JP | 2010-108501 A | 5/2010 |
| JP | 2011-013760 A | 1/2011 |
| WO | 2009/125614 A1 | 10/2009 |

* cited by examiner

DISPLAY DEVICE

TECHNICAL FIELD

The present invention relates to a display device which displays an image.

BACKGROUND ART

Recent years have witnessed widespread use of a display device which includes an input device constituted by a combination of a display driving device which displays an image and an input detection device which detects a user's contact (or approach) operation with respect to the display driving device. In general, a display device of this type is manufactured in such a manner that a touch panel included in an input detection device and a display panel included in a display driving device are separately manufactured, and then assembled by placing the touch panel onto the display panel.

For example, Patent Literature 1 discloses a technique in which a display driving circuit which drives a display panel supplies timing information to a touch screen controller (input detection device), so that synchronization of the touch screen controller and the display is achieved.

Further, Patent Literature 2 discloses such a technique that, in a period in which display scanning driving, in which a plurality of drive electrodes are scanned and driven, is carried out so as to display a predetermined number of display screens (i.e., display a display screen a predetermined number of times), detection scanning driving, in which a whole or a part of the plurality of drive electrodes are continuously scanned and driven, is carried out with respect to a greater number of display screens than the predetermined number of display screens.

CITATION LIST

Patent Literature

Patent Literature 1
Japanese Patent Application Publication, Tokukai, No. 2010-108501 A (Publication Date: May 13, 2010)
Patent Literature 2
Japanese Patent Application Publication, Tokukai, No. 2011-13760 A (Publication Date: Jan. 20, 2011)

SUMMARY OF INVENTION

Technical Problem

However, such display devices including an input detection device has a problem that the input detection device has insufficient detection accuracy due to noise generated in a display driving device. For example, in a case where the display device is a liquid crystal display device, noise tends to be generated at the time of driving liquid crystal included in the display driving device.

Specifically, noise is generated when a voltage is applied to each pixel in accordance with image data in order to cause the display driving device to display an image.

In order to solve this, it has been proposed that a detection process in the input detection device be carried out in periods (a vertical flyback period and a horizontal flyback period) in which less noise is generated by the driving of the liquid crystal. However, due to an increase in resolution of a display section, an increase in report rate of a detection section, etc., the flyback periods are becoming shorter, which is making it more and more difficult to secure a sufficient detection period for the detection section to have high detection accuracy.

In response to this, the inventors have found that a period in which less noise is generated by the driving of liquid crystal exists apart from the flyback period.

The present invention is accomplished in order to solve the problem above and on the basis of the knowledge of the inventors. A principal object of the present invention is to provide a display device which makes it possible to both secure a longer detection period and obtain high detection accuracy.

Solution to Problem

In order to attain the object, a display device in accordance with one aspect of the present invention is a display device including: a display driving device displaying an image; and an input detection device detecting an approach or a contact of an object to the display driving device, the display driving device including: a display panel including (i) a plurality of scanning lines, (ii) a plurality of image signal lines intersecting with the plurality of scanning lines, (iii) a pixel electrode connected to each of the plurality of image signal lines, and (iv) a common electrode facing the pixel electrode; a scanning line driving circuit sequentially supplying a scanning signal to the plurality of scanning lines; and a signal line driving circuit sequentially supplying an image signal to the plurality of image signal lines, a constant voltage being applied to the common electrode at least in a scanning period in which the scanning signal is supplied to the plurality of scanning lines, the input detection device including a detection panel which is provided along the display panel and detects the approach or the contact of the object, the detection panel detecting the approach or the contact of the object in a detection possible period which (i) is a period from a time point when supply of the scanning signal to an m-th (m is a natural number) scanning line is started to a time point when supply of the scanning signal to an (m+1)-th scanning line is started but (ii) excludes a rising period of the image signal supplied to the plurality of image signal lines.

Advantageous Effects of Invention

The display device can secure a longer detection period for detecting an input operation at the detection panel, and can obtain high detection accuracy, accordingly.

DESCRIPTION OF EMBODIMENTS

Embodiment 1

The following description will discuss, with reference to FIGS. 1 through 5, a display device in accordance with an embodiment of the present invention. Note that arrangements described in this embodiment are merely examples and not intended to limit the scope of the invention to the arrangements, unless particularly specified.

[Arrangement of Display Device]

Figure 1:
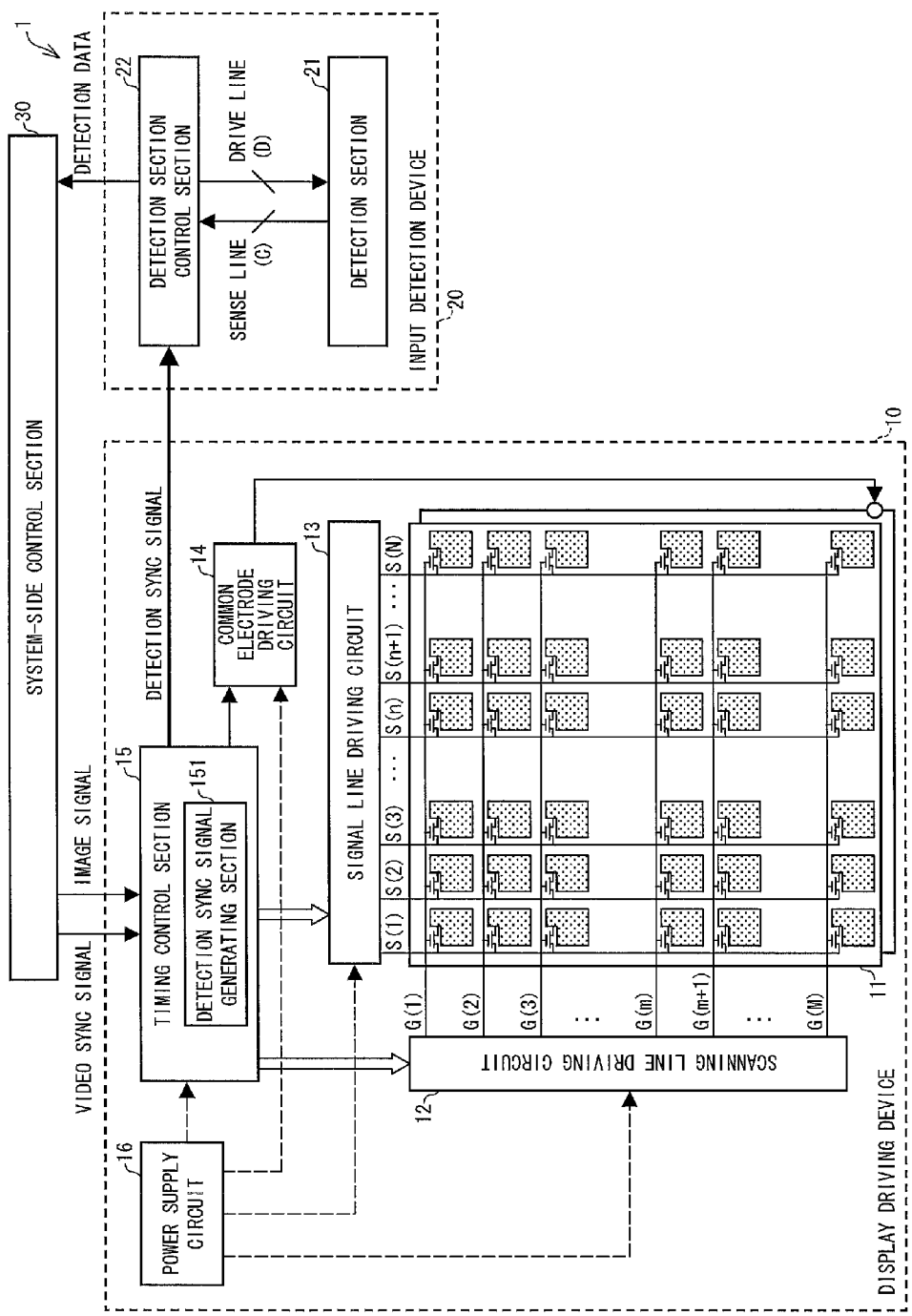
FIG. 1 is a block diagram schematically illustrating an overall arrangement of a display device in accordance with one embodiment of the present invention.

First, the following description will discuss, with reference to FIG. 1, an example arrangement of a display device 1 in accordance with the present embodiment. FIG. 1 is a block diagram illustrating an overall arrangement of the display device 1 in accordance with the present embodiment.

As illustrated in FIG. 1, the display device 1 includes a display driving device 10, an input detection device 20, and a system-side control section 30.

[Arrangement of Display Device]

The display driving device 10 includes a display panel 11, a scanning line driving circuit 12, a signal line driving circuit 13, a common electrode driving circuit 14, a timing control section (control means) 15, and a power supply circuit 16, as illustrated in FIG. 1.

The present embodiment employs an active matrix-type liquid crystal display device as the display driving device 10. As such, the display panel 11 of the present embodiment is an active matrix-type liquid crystal display panel, and the other components given above are for driving this liquid crystal display panel.

(Display Panel)

The display panel 11 includes a plurality of gate signal lines (scanning lines) G and a plurality of source signal lines (image signal lines) S, and further includes a plurality of pixels (pixel regions) defined by the plurality of gate signal lines G and the plurality of source signal line S. Note that the plurality of pixels are arranged in what is called a grid, constituted by a plurality of pixel columns and a plurality of pixel rows.

In the example illustrated in FIG. 1, the display panel 11 includes a total of N source signal lines S, a total of M gate signal lines G, and the plurality of pixels arranged in M rows×N columns (M and N are each a natural number). Note that in FIG. 1, an n-th source signal line is indicated as S(n), and an m-th gate signal line is indicated as G(m) (m and n are natural numbers where m≤M and n≤N).

Further, the display panel 11 includes (i) pixel electrodes provided in the respective pixel regions, (ii) a common electrode facing the pixel electrodes, and (iii) TFTs (switching elements) which are provided in the respective pixel regions and each of which, by means of a gate signal supplied to a corresponding one of the plurality of signal lines G, switches on and off an electric connection between a pixel electrode and a source signal line S corresponding to the pixel electrode.

The plurality of gate signal lines G are arranged so as to be next to one another along a pixel column direction (direction extending along the plurality of pixel columns). Each of the plurality of gate signal lines G is electrically connected to each pixel belonging to a pixel row corresponding to the each of the plurality of gate signal lines G among the plurality of pixel rows.

The plurality of source signal lines S are arranged so as to be next to one another in a pixel row direction (direction extending along the plurality of pixel rows), and each intersect with each of the plurality of gate signal lines G at right angles. Each of the plurality of source signal lines S is electrically connected to each pixel belonging to a pixel column corresponding to the each of the plurality of source signal lines S among the plurality of pixel columns.

Each of the plurality of gate signal lines G supplies, to a TFT connected to the each of the plurality of gate signal lines G, a gate signal supplied from the scanning line driving circuit 12. Each of the plurality of source signal lines S supplies, to a pixel electrode and via a TFT connected to the each of the plurality of source signal lines S, a source signal supplied from the signal line driving circuit 13.

Note that the present embodiment describes an example case in which the display panel is a liquid crystal display panel, but the present invention is not limited to this. The display panel can be, for example, an EL display, a plasma display, or the like.

(Scanning Line Driving Circuit)

The scanning line driving circuit 12 sequentially selects and scans the plurality of gate signal lines G. Specifically, the scanning line driving circuit 12 sequentially selects the plurality of gate signal lines G, and supplies, to a selected gate signal line G, a scanning signal having an ON voltage for switching on the switching element (TFT) of each pixel on the selected gate signal line G.

(Signal Line Driving Circuit)

While the gate signal line G is selected, the signal line driving circuit 13 supplies, in accordance with image data, a source signal to each pixel on the gate signal line G through a source signal line S corresponding to the each pixel. Specifically, the signal line driving circuit 13 (i) calculates, on the basis of an image signal supplied to the signal line driving circuit 13, a value of a voltage to be supplied to the each pixel on the selected gate signal line G and (ii) supplies, from a source output amplifier to the source signal line S corresponding to the each pixel, a voltage having the calculated value. This causes the source signal to be supplied to and written into each pixel on the selected gate signal line G.

(Common Electrode Driving Circuit)

The common electrode driving circuit 14 supplies, to the common electrode provided for the plurality of pixels, a common voltage for driving the common electrode.

(Timing Control Section)

The timing control section 15 is control means for controlling the scanning line driving circuit 12, the signal line driving circuit 13, and the common electrode driving circuit 14.

The timing control section 15 receives an image signal and a control signal from the system-side control section 30. Note that the image signal includes a clock signal, a sync signal, an image data signal, and the like. Also note that the image may be a moving image or a still image.

As indicated by solid arrows in FIG. 1, the timing control section 15 supplies, to the respective driving circuits, various control signals for causing the driving circuits to operate in synchronization with one another.

For example, the timing control section 15 supplies, to the scanning line driving circuit 12, a gate start pulse signal, a gate clock signal GCK, and a gate output control signal GOE. Upon reception of the gate start pulse signal, the scanning line driving circuit 12 starts scanning the plurality of gate signal lines G. Then, the scanning line driving circuit 12 sequentially supplies the ON voltage to the plurality of gate signal lines G in accordance with the gate clock signal GCK and the gate output control signal GOE.

Further, the timing control section 15 supplies, to the signal line driving circuit 13, a source start pulse signal, a source latch strobe signal, and a source clock signal. In response to the source start pulse signal, the signal line driving circuit 13 stores supplied image data of each pixel in a register in accordance with the source clock signal, and, in response to the next source latch strobe signal, supplies a source signal to a corresponding source signal line S which source signal is in accordance with the image data.

It is preferable that the timing control section 15 change a driving method of the display device 1 by changing a driving method of the display driving device 10, and control the scanning line driving circuit 12 and the signal line driving circuit 13 in accordance with the changed driving method.

Examples of the driving method encompass, apart from a normal driving method, (i) dot inversion driving in which the polarity of a scanning signal supplied to each of the plurality of gate signal lines G is reversed every i (i is a natural number) row(s) and (ii) column inversion driving in which a curved line of a source signal supplied to each of the plurality of source signal lines S is reversed every j (j is a natural number) column(s), but the present embodiment is not limited to this. For example, the driving method can be line inversion driving, interlace driving, or the like.

Further, it is preferable that the driving method changed by the timing control section 15 be always reverse polarity driving.

This arrangement allows the display driving device 10 to be driven by use of reverse polarity driving. This makes it possible to both reduce image sticking of the display panel 11 and obtain high detection accuracy.

(Detection Sync Signal Generating Section)

Note, here, that the display driving device 10 of the present embodiment further includes a detection sync signal generating section (sync signal supply means) 151. For example, in the example illustrated in FIG. 1, the display driving device 10 includes the detection sync signal generating section 151 as a function of the timing control section 15.

The detection sync signal generating section 151 generates a detection sync signal (sync signal) which designates a timing of a detection process carried out when a detection section 21 (described later) detects an input operation by the user. Further, the detection sync signal generating section 151 generates the detection sync signal in accordance with the driving method changed by the timing control section 15. Note that the detection sync signal will be described later.

Further, in addition to the detection sync signal, the detection sync signal generating section 151 may supply, to the detection section control section 22, polarity inversion information indicative of inversion of the polarity of the source signal supplied from the timing control section 15 to the signal line driving circuit 13.

(Power Supply Circuit)

As indicated by dotted arrows in FIG. 1, the power supply circuit 16 supplies a voltage to each of the scanning line driving circuit 12, the signal line driving circuit 13, and the common electrode driving circuit 14.

[Arrangement of Input Detection Device]

Figure 2:
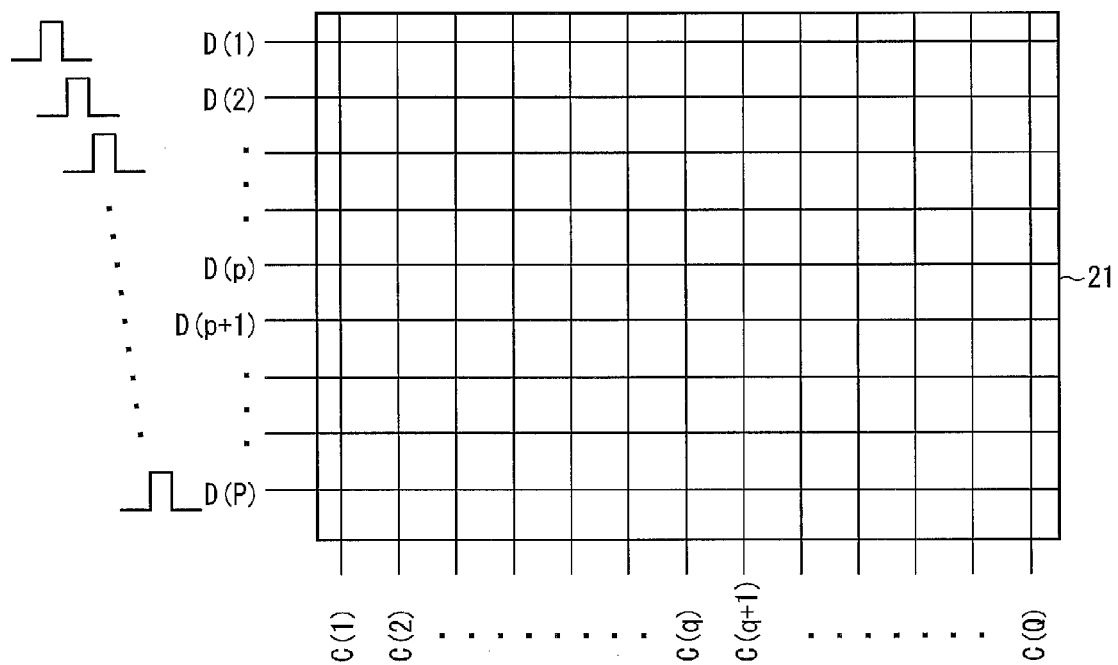
FIG. 2 is a view schematically illustrating an arrangement of a detection section in accordance with one embodiment of the present invention.

Next, the input detection device 20 will be described. The input detection device 20 includes a detection section (detection panel) 21 and a detection section control section 22, as illustrated in FIG. 1. The following description will describe, with reference to FIG. 2, an arrangement of the detection section 21. FIG. 2 is a view schematically illustrating an arrangement of the detection section 21.

(Detection Section)

The detection section 21 is means for detecting an approach or a contact of an object (e.g., a finger, a touch pen, or the like) (hereinafter also referred to as a detection process), and provided, for example, in the form of a touch panel or the like disposed along the display panel 11 of the display driving device 10. Note that the present embodiment describes an example case in which the detection section 21 is, for example, a capacitance touch panel.

As illustrated in FIG. 2, the detection section 21 includes a plurality of drive lines D and a plurality of sense lines C, and each of the plurality of drive lines D intersect with each of the plurality of sense lines C at right angles. In the example illustrated in FIG. 2, the detection section 21 includes a total of P drive lines D and a total of Q sense lines C (P and Q are each a natural number). Note that in FIG. 2, a p-th drive line is indicated as D(p), and a q-th sense line is indicated as C(q) (p and q are natural numbers where p≤P and q≤Q).

The plurality of drive lines D are supplied with a detection pulse signal, sequentially from a first drive line D(1) to a P-th drive line D(P) as illustrated in FIG. 2. When a finger of the user, a touch pen, or the like touches or approaches the detection section 21 in a period in which the detection pulse signal is supplied to the plurality of drive lines D, a capacitance value of a sense line C is changed. The detection section 21 detects the approach or the contact of the object by outputting the changed value of the capacitance of the sense line C.

(Detection Section Control Section)

The detection section control section 22 controls the timing of the detection process carried out by the detection section 21. For example, the detection section control section 22 controls the timing so that the detection section 21 detects a contact of the object in a period which (i) is a period from a time point when supply of the scanning signal to the m-th gate signal line G(m) constituting the display panel 11 of the display driving device 10 is started to a time point when supply of the scanning signal to the (m+1)-th gate signal line G(m+1) is started but (ii) excludes a rising period of the image signal supplied to each of the plurality of source signal lines S.

The detection section control section 22 obtains the detection sync signal from the timing control section 15 of the display driving device 10, as indicated by a bold arrow in FIG. 1. On the basis of the detection sync signal thus obtained, the detection section control section 22 determines (i) a timing for supplying the detection pulse signal to the detection section 21 and (ii) the number of pulses included in the pulse signal to be supplied to the detection section 21.

The detection section control section 22 sequentially supplies, to each of the plurality of drive lines D of the detection section 21, the detection pulse signal determined on the basis of the detection sync signal. In this way, the detection section control section 22 controls the detection section 21 to detect a contact of the object in accordance with the detection sync signal supplied from the display driving device 10.

Further, the detection section control section 22 obtains the change in capacitance value of the sense line C outputted from the detection section 21. On the basis of the obtained change in capacitance value of the sense line C, the detection section control section 22 detects an input operation carried out by the user at the detection section 21. Further, the detection section control section 22 supplies, to the system-side control section 30, detection data which indicates the detected input operation carried out by the user.

[System-Side Control Section]

The system-side control section 30 supplies the image signal and the control signal to the timing control section 15 included in the display driving device 10. Further, the system-side control section 30 obtains the detection data supplied from the detection section control section 22. The system-side control section 30 controls each section of the display device 1 on the basis of the detection data thus obtained.

Note that, in the present embodiment, it is preferable that the display panel 11 and the detection section 21, which is the detection panel, are formed so as to be in close contact with each other so that no air enters (no air space is formed) between the display panel 11 and the detection section 21. This makes it possible to reduce a thickness of the display device 1 along a direction in which the display panel 11 and the detection section 21 are stacked together.

Further, in the present embodiment, the display panel 11 and the detection section 21, which is the detection panel, may be formed integrally. This allows a further reduction in thickness of the display device 1 along the direction in which the display panel 11 and the detection section 21 are stacked together. Further, since the display panel 11 and the detection section 21 do not have to be provided separately, the number of components of the display device 1 can be reduced, so that a reduction in cost is achieved.

[Period with Stable Noise]

Figure 3:
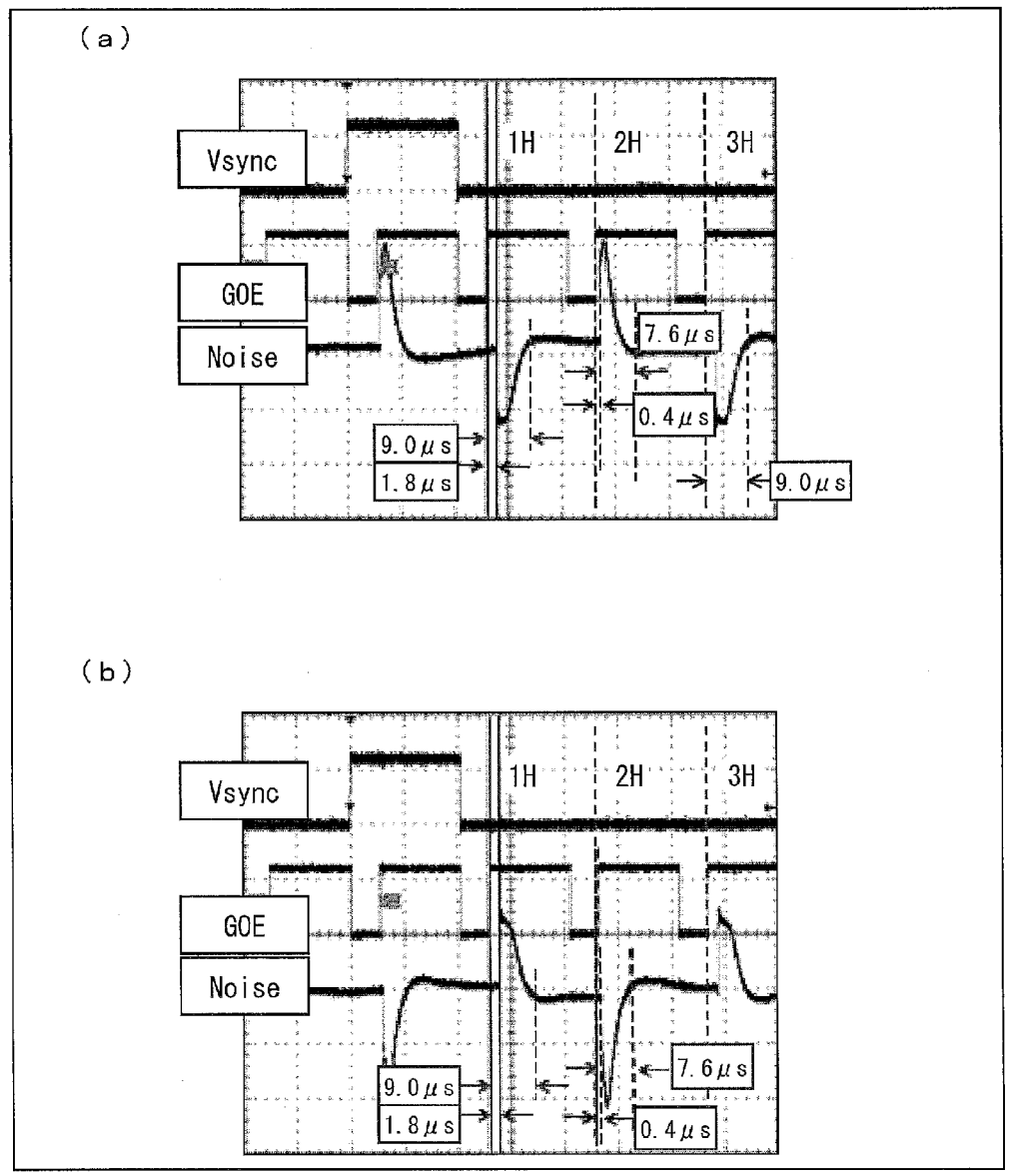
FIG. 3 is a graph showing results of measurement of noise generated in a display panel in accordance with one embodiment of the present invention.

Next, the following description will discuss, with reference to FIG. 3, a period which exists apart from a flyback period and in which less noise is caused by the driving of liquid crystal (noise is stable). FIG. 3 is a graph showing results of measurement of noise generated in the display panel 11 in each horizontal sync period. (a) of FIG. 3 shows noise in first through third horizontal sync periods (1H through 3H) in an x-th frame (x is a natural number), and (b) of FIG. 3 shows noise in first through third horizontal sync periods (1H through 3H) in an (x+1)-th frame. In (a) and (b) of FIG. 3, 'Vsync' indicates a frame start signal which notifies a start of each frame, 'GOE' indicates a cycle of horizontal synchronization (H sync), and 'Noise' indicates noise generated in the display panel 11. Note that examples of a horizontal sync signal in general can encompass Hsync, GCK, and the like, apart from GOE.

Note that in the present embodiment, a horizontal sync period is a period which includes (i) a scanning period in which each gate signal line is scanned (corresponding to a period in which GOE is at a high level) and (ii) a horizontal flyback period (corresponding to a period in which GOE is at a low level).

In the x-th frame, supply of the source signal to each source signal line S is started simultaneously with a start of the first horizontal sync period. At this time, as shown in (a) of FIG. 3, noise is generated immediately after the first horizontal sync period begins, that is, immediately after supply of the source signal to each source signal line S is started, and then the noise becomes small (stable) after a certain period of time has passed. Further, noise is generated immediately after the second horizontal sync period begins, and the noise becomes stable after a certain period of time has passed. Still further, noise is generated immediately after the third horizontal sync period begins, and the noise becomes stable after a certain period of time has passed. That is, a period from immediately after each horizontal sync period begins until a certain period of time has passed corresponds to a rising period or a falling period of the source signal supplied to each source signal line S. Note that in the present embodiment, the rising period and the falling period of the source signal may both be referred to as 'rising period' without being distinguished from each other.

In the present embodiment, as shown in (a) of FIG. 3, a period from a time point when the first horizontal sync period begins to a time point when the noise becomes stable is 9.0 μs, a period from a time point when the second horizontal sync period begins to a time point when the noise becomes stable is 7.6 μs, and a period from a time point when the third horizontal sync period begins to a time point when the noise becomes stable is 9.0 μs.

Note that in the present embodiment, as shown in (a) of FIG. 3, a period from a time point when the first horizontal sync period begins to a time point when the noise is generated is 1.8 μs, a period from a time point when the second horizontal sync period begins to a time point when the noise is generated is 0.4 μs, and a period from a time point when the third horizontal sync period begins to a time point when the noise is generated is 1.8 μs.

Further, in the (x+1)-th frame, supply of the source signal to each source signal line S is started simultaneously with the start of the first horizontal sync period. At this time, as shown in (b) of FIG. 3, noise is generated immediately after the first horizontal sync period begins, that is, immediately after supply of the source signal to each source signal line S is started, and then the noise becomes small (stable) after a certain period of time has passed. Further, noise is generated immediately after the second horizontal sync period begins, and the noise becomes small after a certain period of time has passed. Still further, noise is generated immediately after the third horizontal sync period begins, and the noise becomes stable after a certain period of time has passed.

Note that in the present embodiment, as shown in (b) of FIG. 3, (i) a period from a time point when each horizontal sync period begins to a time point when noise is generated and (ii) a period from the time point when each horizontal sync period begins to a time point when the noise is stabilized are equal to the respective periods shown in (a) of FIG. 3.

Note that the polarity of the source signal supplied to each source signal line S is reversed between the x-th frame and the (x+1)-th frame, so that the polarity of the noise generated in each horizontal sync period is also reversed between the x-th frame and the (x+1)-th frame, as shown in (a) and (b) of FIG. 3.

As described above, the inventors have found that, even in a horizontal sync period, that is, in a period in which the source signal is supplied to each source signal line S (image data is written into each pixel electrode), a period with great noise and a period with small (stable) noise exist.

Note that the period with the great noise and the period with the small noise are included in the horizontal sync period for the following reason. First, when supply of the source signal to a source signal line S is started, an electric potential of the source signal line S significantly changes (that is, an electric potential of the pixel electrode significantly changes), so that noise is generated. Then, until the supply of the source signal is ended, the electric potential of the source signal line S changes little (that is, the electric potential of the pixel electrode varies little), so that the noise becomes small and stable.

(Non-Detection Period)

Hereinafter, a period (a rising period of the source signal supplied to a source signal line S) with great noise in a horizontal sync period, which period is from a time point when the horizontal sync period begins to a time point when noise becomes stable, will be referred to as a non-detection period.

The non-detection period is specified, for example, by a time constant $\tau$ ($\tau$=RC) determined by an inter-terminal capacitance (e.g., Cds, Cgs, etc.) of the transistor, a capacitance of each bus line, a resistance (R) of the source signal line S. As a matter of course, in addition to the time constant, a resistance of the TFT, a liquid crystal capacitance of a liquid crystal layer (not shown) included in the display panel 11, and the like can also be taken into account in determining the non-detection period. Note that, as clear from FIG. 3, the time constant $\tau$ is on the order of several μs (can also vary in accordance with panel size and resolution) in the present embodiment.

Note that, as shown in FIG. 3, the period until the noise becomes stable is not very affected by the polarity of each horizontal sync period in the n-th frame and the (n+1)-th frame, but may differ depending on whether each horizontal sync period is an odd-numbered period (in FIG. 3, 1H and 3H) or an even-numbered period (in FIG. 3, 2H). In a case where the period until the noise becomes stable thus differs depending on the horizontal sync period, it is preferable that a non-detection period be set individually to each of the different periods until the noise becomes stable (in FIG. 3, two non-detection periods are set).

[Detection Sync Signal]

In the display device 1 in accordance with the present embodiment, the detection sync signal generating section 151 generates the detection sync signal for establishing synchronization between (i) a period which is included in a horizontal sync period and in which noise is stable (i.e., a period excluding the non-detection period) and (ii) a period in which the detection process is carried out by the detection section 21. The detection sync signal is a signal which designates, in accordance with the driving method of the display device 1 changed by the timing control section 15, a timing at which the detection section 21 carries out the detection process in detecting an input operation by the user.

The input detection device 20 obtains the detection sync signal generated by the detection sync signal generating section 151 included in the display driving device 10, and carries out the detection process by means of the detection section 21 at the timing designated by the detection sync signal.

It is preferable that the detection sync signal be a signal which indicates a start timing of a detection possible period which (i) is a period from a time point when supply of the scanning signal to a gate signal line G is started to a time point when an operation signal is supplied to another gate signal line G subsequent to the gate signal line G but (ii) excludes a non-detection period. It is more preferable that the detection sync signal be a signal which indicates the start timing to a finish timing of the detection possible period (that is, the detection possible period itself). In a case where a detection operation is thus carried out by the detection section 21 at the timing indicated by the detection sync signal, a sufficient detection period enabling the detection section to have high detection accuracy can be ensured as compared to a case in which, for example, the detection operation is carried out only in a vertical flyback period or a horizontal flyback period.

Figure 4:
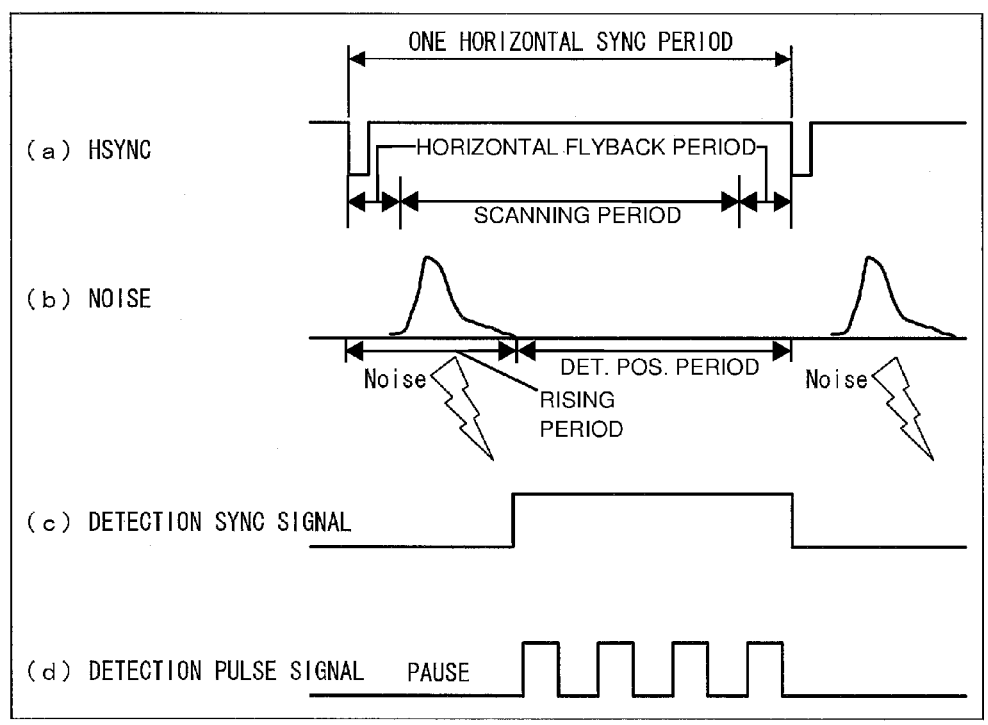
FIG. 4 is a timing diagram showing a detection sync signal generated in a detection sync signal generating section in accordance with one embodiment of the present invention.

The following description will discuss, with reference to FIG. 4, a detection sync signal in accordance with the present embodiment. FIG. 4 is a timing diagram showing a detection sync signal generated in the detection sync signal generating section 151 in accordance with the present embodiment.

A horizontal sync period, shown in (a) of FIG. 4, which is determined by a horizontal sync signal (HSYNC) included in a control signal outputted from the timing control section 15 includes a non-detection period with great noise as shown in (b) of FIG. 4. This noise is caused by, for example, a rise of the source signal supplied to a source signal line S as described above.

The detection sync signal generating section 151 generates, as shown in (c) of FIG. 4, the detection sync signal during one (1) horizontal sync period and after the non-detection period shown in (b) of FIG. 4 has passed. The detection sync signal thus generated is supplied to the detection section control section 22 included in the input detection device 20.

The detection section control section 22 generates, in accordance with the detection sync signal thus supplied, a detection pulse signal as shown in (d) of FIG. 4.

This allows the detection section 21 to carry out the detection process in a period in which little influence is given from noise generated in the display driving device 10. Accordingly, the detection section 21 can have high detection accuracy.

[Accuracy of Detection of Input Operation]

Figure 5:
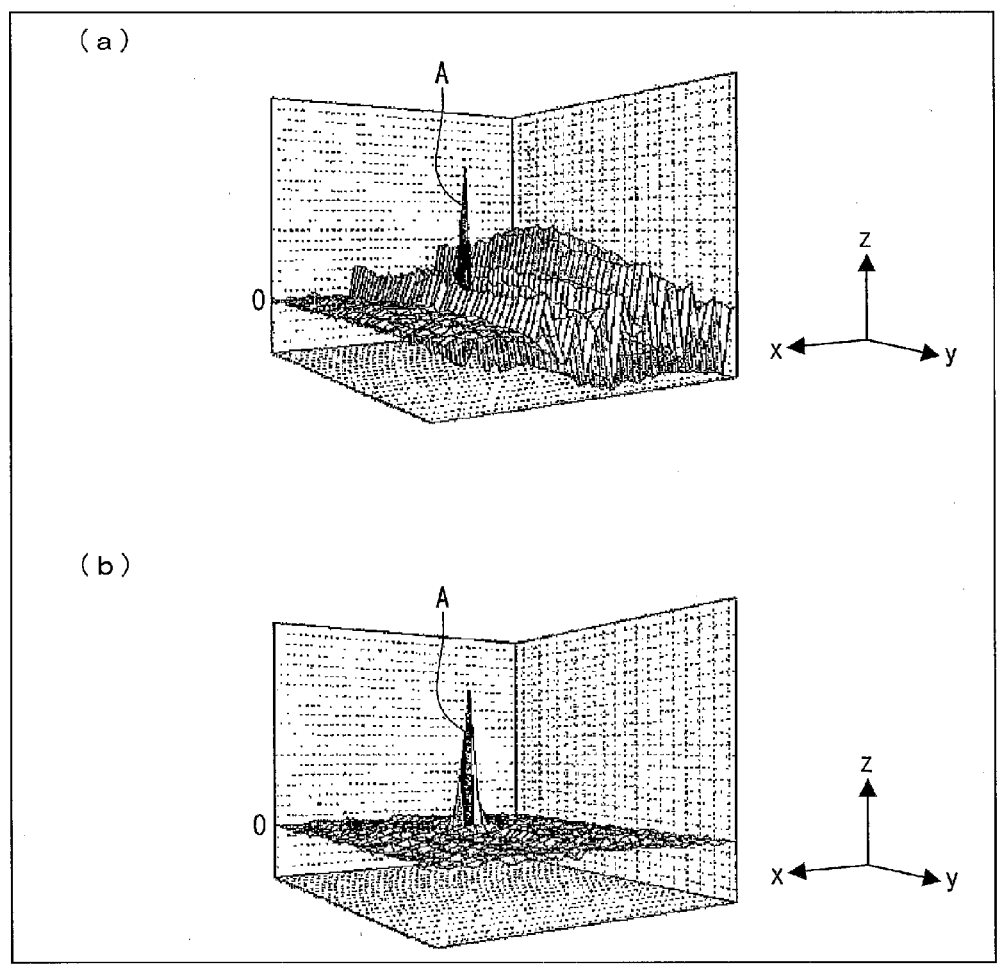
FIG. 5 is a graph showing detection accuracy of a detection section in accordance with one embodiment of the present invention in detecting an input operation carried out by a user.

Next, the following description will discuss, with reference to FIG. 5, detection accuracy of the detection section 21 in detecting an input operation carried out by the user. FIG. 5 is a graph showing detection accuracy of the detection section 21 in detecting an input operation carried out by the user. (a) of FIG. 5 shows detection accuracy corresponding to a case in which synchronization between the display driving device 10 and the input detection device 20 is not established by means of the detection sync signal, and (b) of FIG. 5 shows detection accuracy corresponding to a case in which the synchronization is established. Note that in each of (a) and (b) of FIG. 5, an x axis and a y axis represent a position in the detection section 21, and z axis represents a change in capacitance of the detection section 21 which change is detected by the detection section 21.

In a case where an image display operation by the display driving device 10 and an input operation-detecting operation by the input detection device 20 are not synchronized with each other by means of the detection sync signal, the detection section 21 undesirably also detects, as shown in (a) of FIG. 5, a change in capacitance of the detection section 21 other than a change A that is caused in the capacitance of the detection section 21 by a contact of a finger, a touch pen, etc. to the detection section 21. Note that the change in capacitance other than the change A is likely to be caused by noise generated in a non-detection period.

On the other hand, in a case where the image display operation by the display driving device 10 and the input operation-detecting operation by the input detection device are synchronized with each other by means of the detection sync signal (that is, in a case where the detection process is carried out by the detection section 21 in horizontal sync periods excluding non-detection periods), only the change A can be detected efficiently, as shown in (b) of FIG. 5.

Note that the present embodiment has described an example case in which a non-detection period is a period from a time point when a horizontal sync period begins to a time point when noise becomes stable, but the present invention is not limited to this. For example, it is possible to employ an arrangement in which, for example, the period from the time point when the first horizontal sync period begins to the time point when the noise is generated as illustrated in FIG. 3 is a period not included in the non-detection period (i.e., a period in which the detection process is carried out by the detection section 21).

Further, the present embodiment has described an example case in which frame inversion driving, in which the polarity of the source signal supplied to each of the plurality of source signal lines S is reversed between the x-th frame and the (x+1)-th frame as shown in FIG. 3, but the present invention is not limited to this. For example, it is possible to carry out two-frame inversion driving in which the polarity of the source signal is reversed every two frames, or X-frame inversion driving in which the polarity of the source signal is reversed every X frames (X is a natural number).

[Detection Process Timing]

Next, the following description will discuss how the display device 1 operates in a case where the timing control section 15 changes the driving method of the display device 1 between dot inversion driving and column inversion driving.

(Dot Inversion Driving)

Figure 6:
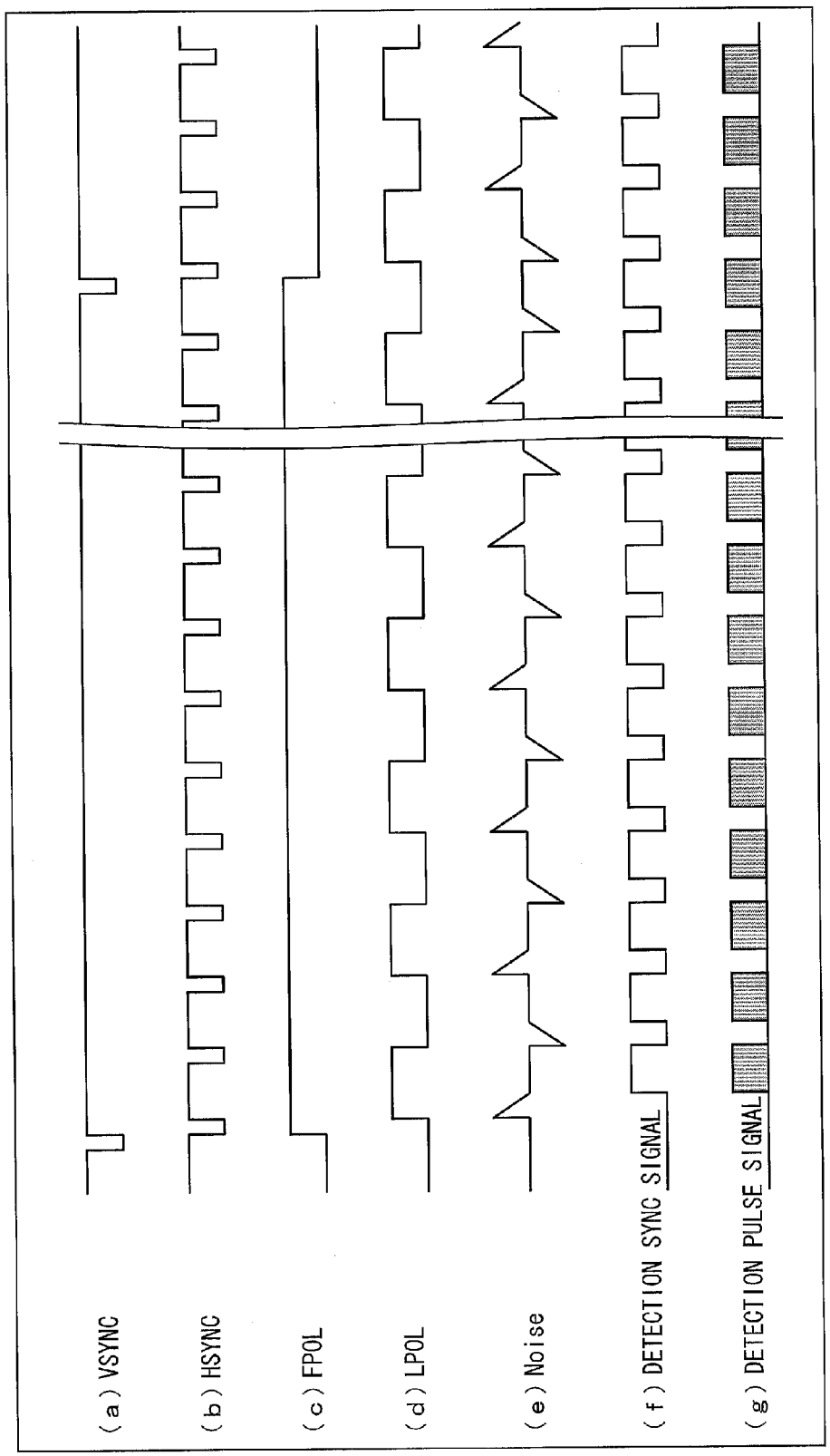
FIG. 6 is a timing diagram showing timings of a detection process carried out in a case where a driving method of a display device in accordance with one embodiment of the present invention is one-dot inversion driving.

First, the following description will discuss, with reference to FIG. 6, a timing of the detection process carried out by the detection section 21 in a case where the timing control section 15 changes the driving method of the display device 1 to one-dot inversion driving in which the polarity of the scanning signal is reversed every gate signal line G (i=1).

FIG. 6 is a timing diagram showing timings of the detection process carried out in a case where the driving method of the display device 1 is one-dot inversion driving. (a) of FIG. 6 shows a vertical sync signal (VSYNC), (b) of FIG. 6 shows a horizontal sync signal (HSYNC), (c) of FIG. 6 shows a frame polarity signal (FPOL) indicative of a polarity in each frame, (d) of FIG. 6 shows a line polarity signal (LPOL) indicative of the polarity of each gate signal line G, (e) of FIG. 6 shows noise, (f) of FIG. 6 shows a detection sync signal, and (g) of FIG. 6 shows a detection pulse signal.

As shown in (a) of FIG. 6, the horizontal sync signal includes frame periods (corresponding to periods in which VSYNC is at a high level) and vertical flyback periods (corresponding to periods in which VSYNC is at a low level), and the timing control section 15 controls the scanning line driving circuit 12 and the signal line driving circuit 13 to refresh an image displayed in the display panel 11 in each frame period.

In one-dot inversion driving, the frame polarity signal is reversed every frame period indicated by the vertical sync signal as shown by (a) and (c) of FIG. 6, and the line polarity signal is reversed every horizontal sync period indicated by the horizontal sync signal as shown by (b) and (d) of FIG. 6.

Further, as shown by (b) and (e) of FIG. 6, each horizontal sync period includes a period in which noise is great due to a rise of the source signal supplied to the source signal line S.

The detection sync signal generating section 151 generates such a detection sync signal that, as shown in (f) of FIG. 6, the period with great noise shown in (e) of FIG. 6 is regarded as a non-detection period. At this time, since the absolute value of the noise is substantially equal as shown in (e) of FIG. 6, a period in which the detection sync signal generated by the detection sync signal generating section 151 is at a high level is substantially uniform across the horizontal sync periods. The timing control section 15 supplies the detection sync signal generated by the detection sync signal generating section 151 to the detection section control section 22.

The detection section control section 22 generates, in accordance with the supplied detection sync signal, a detection pulse signal shown in (g) of FIG. 6, and supplies the generated detection pulse signal to the detection section 21. The detection section 21 carries out the detection process in accordance with the detection pulse signal supplied from the detection section control section 22.

Note that in a case where the driving method of the display device 1 is dot inversion driving, a period in which the detection sync signal is at a high level is substantially uniform across the horizontal sync periods, as shown in (f) of FIG. 6. Accordingly, a timing of the detection process and a length of a period in which the detection process is carried out are each substantially uniform across the horizontal sync periods, as shown in (g) of FIG. 6.

As described above, the detection section 21 can carry out the detection process in a period in which little influence is given from noise generated in the display driving device 10, in accordance with the detection sync signal. This allows the detection section 21 to have high detection accuracy.

(Column Inversion Driving)

Figure 7:
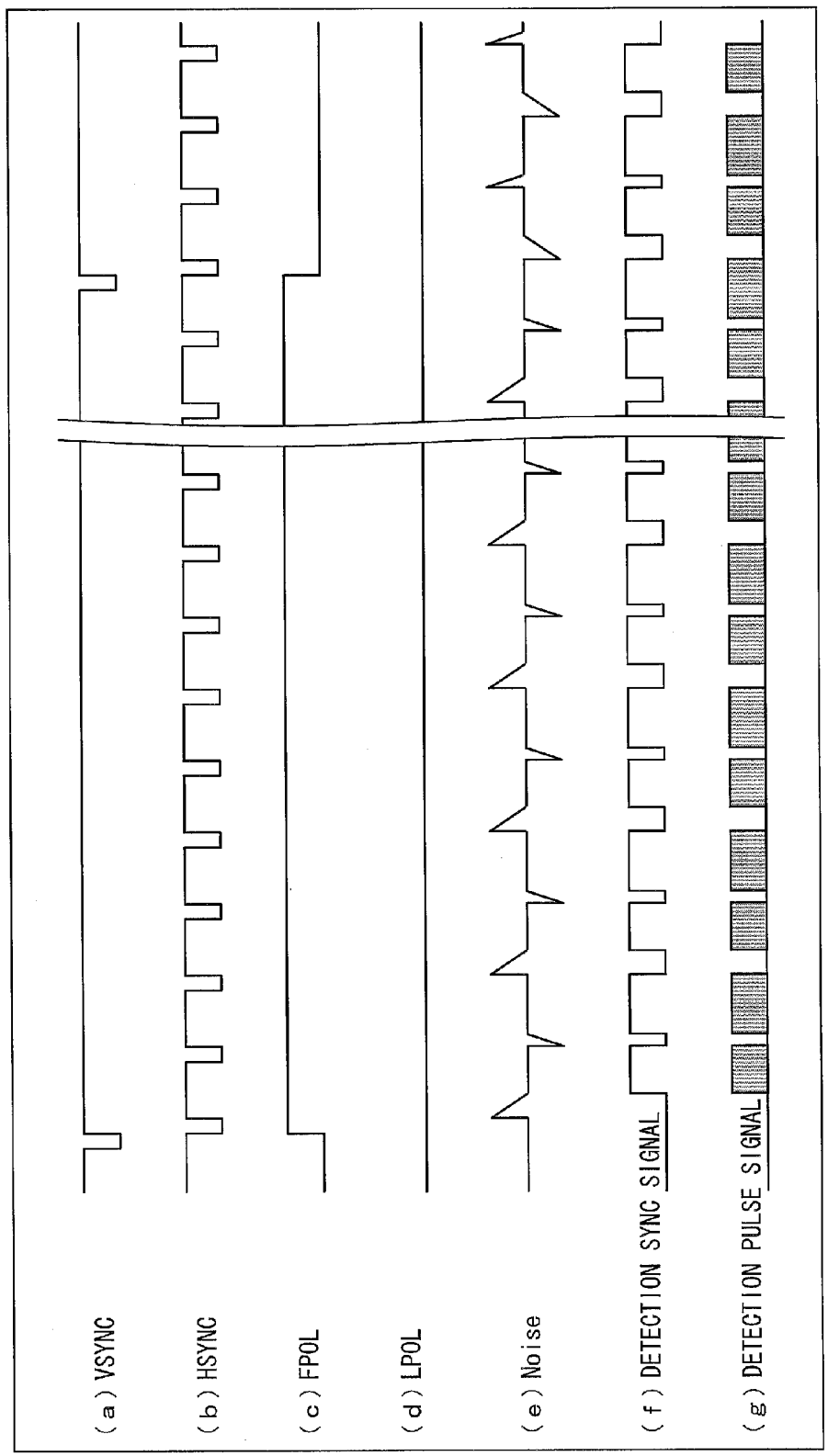
FIG. 7 is a timing diagram showing timings of a detection process carried out in a case where a driving method of a display device in accordance with one embodiment of the present invention is one-column inversion driving.

Next, the following description will discuss, with reference to FIG. 7, a timing of the detection process carried out by the detection section 21 in a case where the timing control section 15 changes the driving method of the display device 1 to one-column inversion driving in which the polarity of the source signal is reversed every source signal line S (j=1).

FIG. 7 is a timing diagram showing timings of the detection process carried out in a case where the driving method of the display device 1 is one-column inversion driving. (a) of FIG. 7 shows a vertical sync signal (VSYNC), (b) of FIG. 7 shows a horizontal sync signal (HSYNC), (c) of FIG. 7 shows a frame polarity signal (FPOL), (d) of FIG. 7 shows a line polarity signal (LPOL), (e) of FIG. 7 shows noise, (f) of FIG. 7 shows a detection sync signal, and (g) of FIG. 7 shows a detection pulse signal.

In one-column inversion driving, the frame polarity signal is reversed every frame period indicated by the vertical sync signal as shown by (a) and (c) of FIG. 7, and the line polarity signal is constant irrespective of the frame period and the horizontal sync period which is indicated by the horizontal sync signal as shown by (b) and (d) of FIG. 6.

Further, as shown by (b) and (e) of FIG. 7, each horizontal sync period includes a period in which noise is great due to a rise of the source signal supplied to the source signal line S.

The detection sync signal generating section 151 generates such a detection sync signal that, as shown in (f) of FIG. 7, the period with great noise shown in (e) of FIG. 7 is regarded as a non-detection period. At this time, since the absolute value of the noise differs every horizontal sync period as shown in (e) of FIG. 7, a period in which the detection sync signal generated by the detection sync signal generating section 151 is at a high level also differs every horizontal sync period. The timing control section 15 supplies the detection sync signal generated by the detection sync signal generating section 151 to the detection section control section 22.

The detection section control section 22 generates, in accordance with the supplied detection sync signal, a detection pulse signal shown in (g) of FIG. 7, and supplies the generated detection pulse signal to the detection section 21. The detection section 21 carries out the detection process in accordance with the detection pulse signal supplied from the detection section control section 22.

Note that in a case where the driving method of the display device 1 is column inversion driving, a period in which the detection sync signal is at a high level differs every horizontal sync period, as shown in (f) of FIG. 7. Accordingly, a timing of the detection process and a length of a period in which the detection process is carried out also each differ every horizontal sync period, as shown in (g) of FIG. 7.

As described above, the detection section 21 can carry out the detection process in a period in which little influence is given from noise generated in the display driving device 10, in accordance with the detection sync signal. This allows the detection section 21 to have high detection accuracy.

In the display device 1 in accordance with the present embodiment, in a case where the timing control section 15 changes the driving method of the display device 1, the detection sync signal generating section 151 can generate a detection sync signal that indicates a timing of the detection process which timing is in accordance with the changed driving method. This allows the detection section 21 to carry out the detection process at a timing suitable for the driving method changed by the timing control section 15.

Note that the present embodiment has described example cases in which one-dot inversion driving and one-column inversion driving are carried out, respectively, but the present invention is not limited to these. For example, it is possible to carry out two-dot inversion driving (i=2), or two-column inversion driving (j=2).

Further, the present embodiment has described an example case in which the detection sync signal generating section 151 generates a detection sync signal according to the driving method of the display device 1, but the present invention is not limited to this. For example, it is possible to employ an arrangement in which the display device 1 includes a storage section (not shown) in which detection sync signals corresponding to respective driving methods are stored in advance, and the detection sync signal generating section 151 reads out, from the storage section, a detection sync signal corresponding to the driving method of the display device 1 changed by the timing control section 15.

Note that the present embodiment has described an example case in which the detection sync signal is a signal which indicates a period in which the detection process can be carried out by the detection section 21, but the present invention is not limited to this. For example, it is possible to employ an arrangement in which the detection sync signal is a signal which indicates a start timing of the detection process carried out by the detection section 21.

Further, the timing control section 15 in accordance with the present embodiment may determine, on the basis of a combination of the line polarity signal and the frame polarity signal, which driving method a current driving method is. In this case, the timing control section 15 can generate a detection sync signal suitable for the driving method determined by the combination of the line polarity signal and the frame polarity signal.

According to this arrangement, the timing control section 15 can generate a detection sync signal suitable for the current driving method, even in a case where the timing control section 15 does not know which driving method the current driving method is.

Embodiment 2

Figure 8:
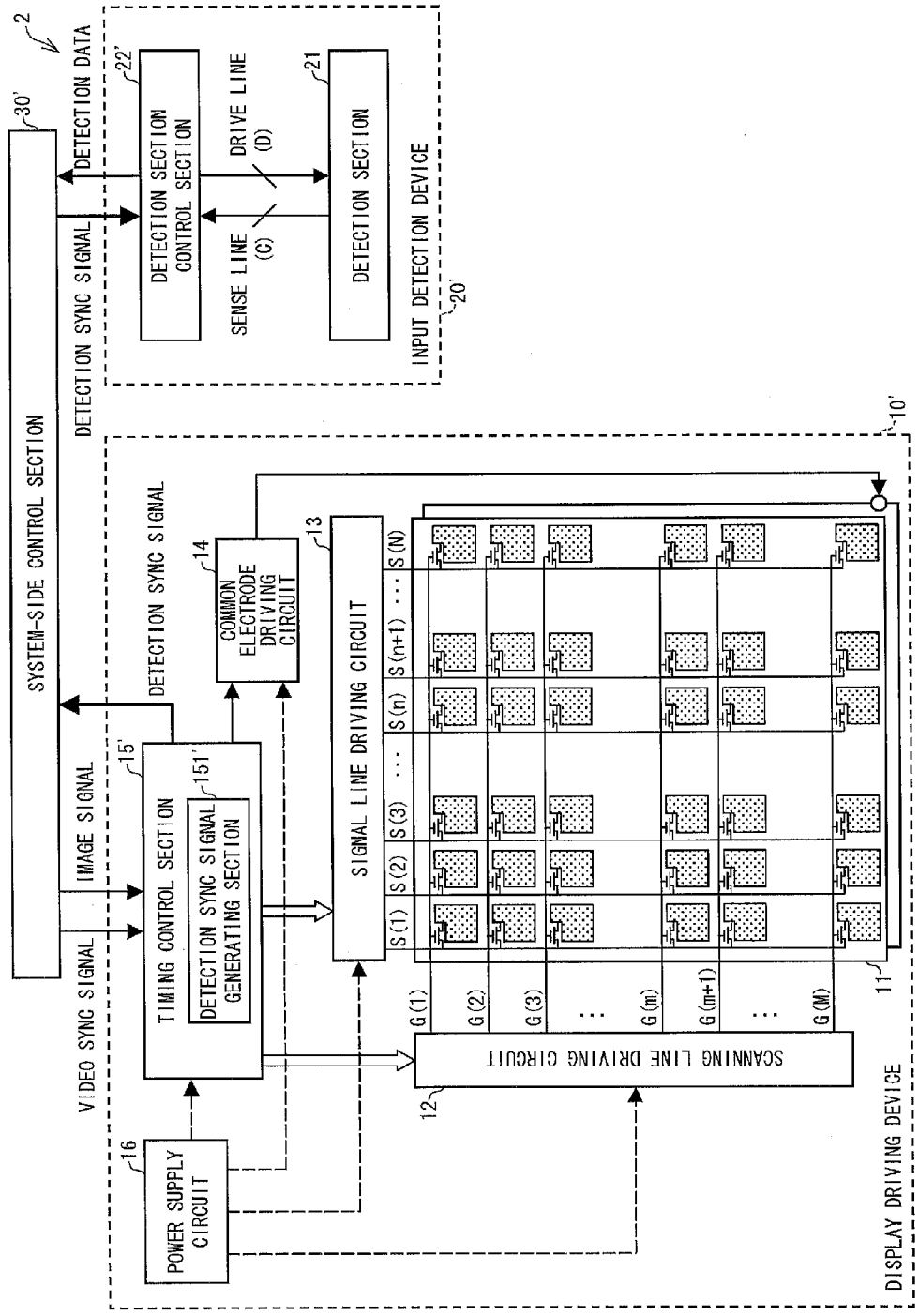
FIG. 8 is a block diagram schematically illustrating an overall arrangement of a display device in accordance with another embodiment of the present invention.

The following description will discuss, with reference to FIG. 8, another embodiment of the present invention. For easy explanation, the same reference signs will be given to members having the same function as a member in accordance with Embodiment 1, and descriptions on such a member will be omitted. The present embodiment will mainly describe differences between Embodiments 1 and 2.

FIG. 8 is a view illustrating an overall arrangement of the display device 1 in accordance with the present embodiment. As illustrated in FIG. 8, a display device 2 has the same arrangement as that of the display device 1 described in Embodiment 1, except that a detection sync signal is supplied from a detection sync signal generating section 151' included in a timing control section 15' to a system-side control section 30', and then supplied from the system-side control section 30' to a detection section control section 22' included in an input detection device 20'.

As illustrated in FIG. 8, the timing control section 15' included in a display driving device 10' supplies, to the system-side control section 30', the detection sync signal generated at the detection sync signal generating section 151'.

The system-side control section 30' supplies, to the detection section control section 22' included in the input detection device 20', the detection sync signal obtained from the timing control section 15'.

The detection section control section 22' determines, on the basis of the detection sync signal supplied from the system-side control section 30', (i) a timing for supplying a detection pulse signal to the detection section 21 and (ii) the number of pulses to be supplied.

Further, in addition to the detection sync signal, the system-side control section 30' may supply, to the detection section control section 22', polarity inversion information which indicates inversion of the polarity of a source signal (video signal) supplied to the signal line driving circuit 13 via the timing control section 15.

Embodiment 3

Figure 9:
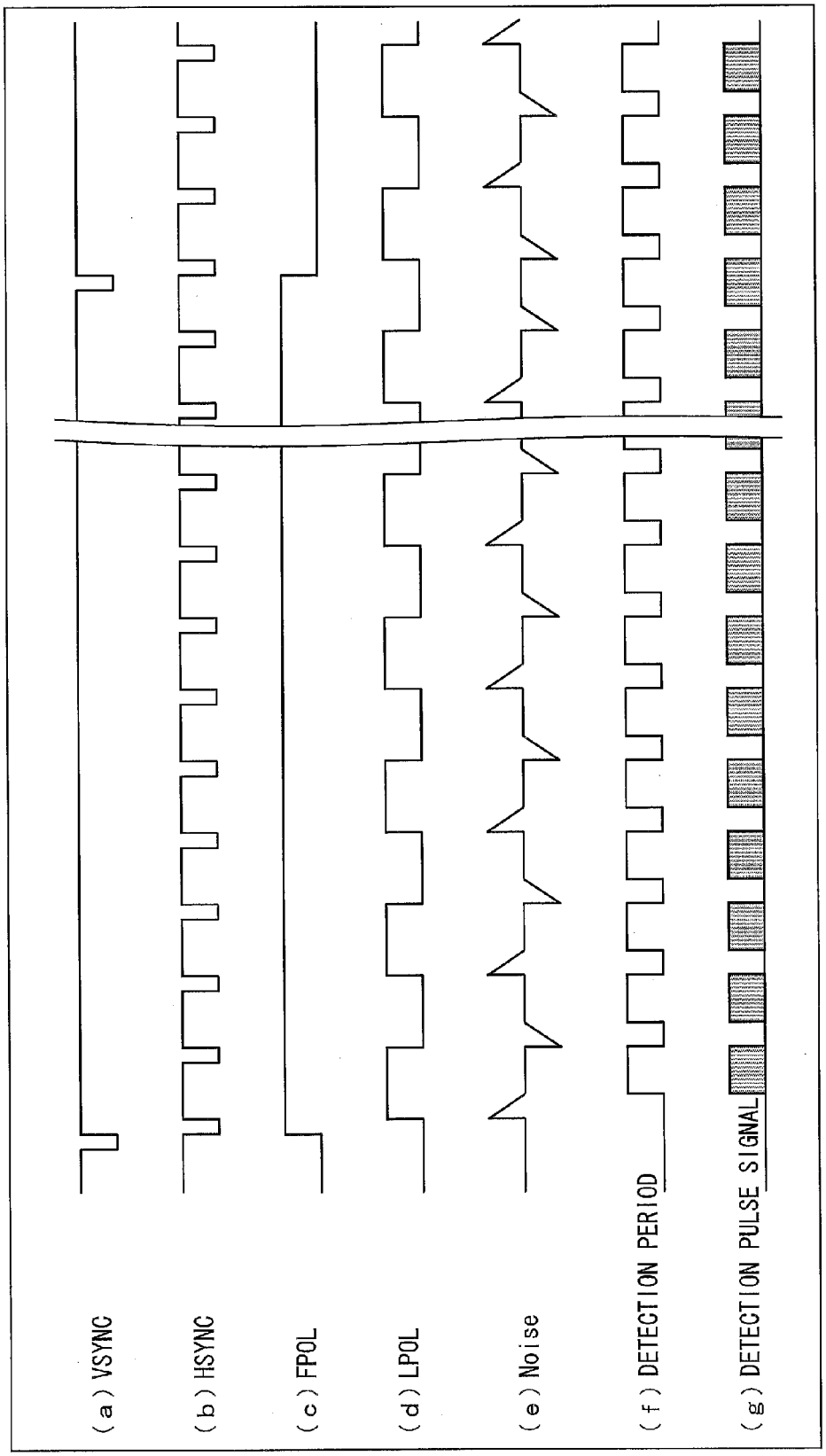
FIG. 9 is a timing diagram showing timings of a detection process carried out in a case where a driving method of a display device in accordance with yet another embodiment of the present invention is one-dot inversion driving.
Figure 10:
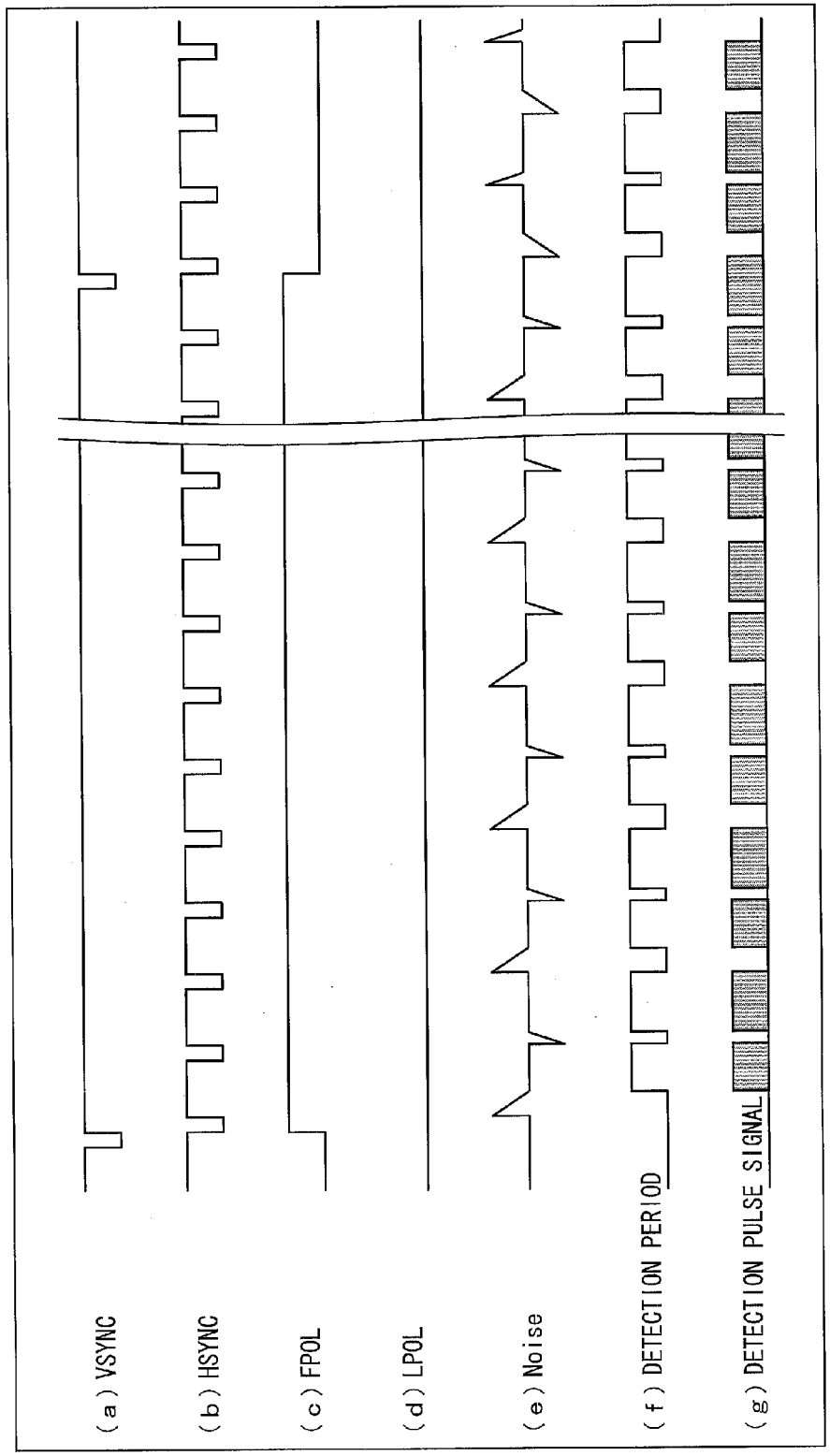
FIG. 10 is a timing diagram showing timings of a detection process carried out in a case where a driving method of a display device in accordance with still yet another embodiment of the present invention is one-column inversion driving.

The following description will discuss, with reference to FIGS. 9 and 10, another embodiment of the present invention. Note that the present embodiment is the same as the display device 1 in accordance with Embodiment 1, except that the detection section control section 22 has a function of setting, without using the detection sync signal, a detection period for designating a timing of the detection process carried out by the detection section 21.

[Detection Process Timing]

The following description will discuss how the display device 1 operates when the timing control section 15 changes the driving method of the display device 1 between dot inversion driving and column inversion driving, in a case where the detection section control section 22 has the function of setting, without using the detection sync signal, the detection period for designating a timing of the detection process carried out by the detection section 21.

(Dot Inversion Driving)

First, the following will discuss, with a reference to FIG. 9, a timing of the detection process carried out by the detection section 21 in a case where the timing control section 15 changes the driving method of the display device 1 to one-dot inversion driving in which the polarity of a scanning signal is reversed every gate signal line G (i=1).

FIG. 9 is a timing diagram showing timings of the detection process carried out in a case where the driving method of the display device 1 is changed to one-dot inversion driving. (a) of FIG. 9 shows a vertical sync signal (VSYNC), (b) of FIG. 9 shows a horizontal sync signal (HSYNC), (c) of FIG. 9 shows a frame polarity signal (FPOL), (d) of FIG. 9 shows a line polarity signal (LPOL), (e) of FIG. 9 shows noise, (f) of FIG. 9 shows detection periods each of which is set by the detection section control section 22 and indicates a timing of the detection process carried out by the detection section 21, and (g) of FIG. 9 shows a detection pulse signal.

As shown in (a) of FIG. 9, the horizontal sync signal includes frame periods (corresponding to periods in which VSYNC is at a high level) and vertical flyback periods (corresponding to periods in which VSYNC is at a low level), and the timing control section 15 controls the scanning line driving circuit 12 and the signal line driving circuit 13 to refresh an image displayed in the display panel 11 in each frame period.

In one-dot inversion driving, the frame polarity signal is reversed every frame period indicated by the vertical sync signal as shown by (a) and (c) of FIG. 9, and the line polarity signal is reversed every horizontal sync period indicated by the horizontal sync signal as shown by (b) and (d) of FIG. 9.

Further, as shown by (b) and (e) of FIG. 9, each horizontal sync period includes a period in which noise is great due to a rise of the source signal supplied to the source signal line S.

The detection section control section 22 sets such a detection period that, as shown in (f) of FIG. 9, the period with great noise shown in (e) of FIG. 9 is regarded as a non-detection period. At this time, since the absolute value of the noise is substantially equal as shown in (e) of FIG. 9, a period set by the detection section control section 22 as a detection period (corresponding to a period at a high level in (f) of FIG. 9) is substantially uniform across the horizontal sync periods.

The detection section control section 22 generates, in accordance with the detection period thus set, a detection pulse signal shown in (g) of FIG. 9, and supplies the generated detection pulse signal to the detection section 21. The detection section 21 carries out the detection process in accordance with the detection pulse signal supplied from the detection section control section 22.

Note that in a case where the driving method of the display device 1 is dot inversion driving, a detection period is substantially uniform across the horizontal sync periods, as shown in (f) of FIG. 6. Accordingly, a timing of the detection process and a length of a period in which the detection process is carried out are each substantially uniform across the horizontal sync periods, as shown in (g) of FIG. 6.

As described above, the detection section 21 can carry out the detection process in a period in which little influence is given from noise generated in the display driving device 10, in accordance with the detection period set by the detection section control section 22. This allows the detection section 21 to have high detection accuracy.

(Column Inversion Driving)

Next, the following description will discuss, with reference to FIG. 10, a timing of the detection process carried out by the detection section 21 in a case where the timing control section 15 changes the driving method of the display device 1 to one-column inversion driving in which the polarity of the source signal is reversed every source signal line S (j=1).

FIG. 10 is a timing diagram showing timings of the detection process carried out in a case where the driving method of the display device 1 is changed to one-column inversion driving. (a) of FIG. 10 shows a vertical sync signal (VSYNC), (b) of FIG. 10 shows a horizontal sync signal (HSYNC), (c) of FIG. 10 shows a frame polarity signal (FPOL), (d) of FIG. 10 shows a line polarity signal (LPOL), (e) of FIG. 10 shows noise, (f) of FIG. 10 shows detection periods each of which is set by the detection section control section 22 and indicates a timing of the detection process carried out by the detection section 21, and (g) of FIG. 7 shows a detection pulse signal.

In one-column inversion driving, the frame polarity signal is reversed every frame period indicated by the vertical sync signal as shown by (a) and (c) of FIG. 10, and the line polarity signal is constant irrespective of the frame period and the horizontal sync period which is indicated by the horizontal sync signal as shown by (b) and (d) of FIG. 10.

Further, as shown by (b) and (e) of FIG. 10, each horizontal sync period includes a period in which noise is great due to a rise of the source signal supplied to the source signal line S.

The detection section control section 22 sets such a detection period that, as shown in (f) of FIG. 10, the period with great noise shown in (e) of FIG. 10 is regarded as a non-detection period. At this time, since the absolute value of the noise differs every horizontal sync period as shown in (e) of FIG. 10, a period set by the detection section control section 22 as a detection period (corresponding to a period at a high level in (f) of FIG. 10) also differs every horizontal sync period.

The detection section control section 22 generates, in accordance with the detection period thus set, a detection pulse signal shown in (g) of FIG. 10, and supplies the generated detection pulse signal to the detection section 21. The detection section 21 carries out the detection process in accordance with the detection pulse signal supplied from the detection section control section 22.

Note that in a case where the driving method of the display device 1 is column inversion driving, a detection period differs every horizontal sync period, as shown in (f) of FIG. 10. Accordingly, a timing of the detection process and a length of a period in which the detection process is carried out also each differ every horizontal sync period, as shown in (g) of FIG. 10.

As described above, the detection section 21 can carry out the detection process in a period in which little influence is given from noise generated in the display driving device 10, in accordance with the detection period set by the detection section control section 22. This allows the detection section 21 to have high detection accuracy.

In the display device 1 in accordance with the present embodiment, in a case where the timing control section 15 changes the driving method of the display device 1, the detection section control section 22 can set a detection period that indicates a timing of the detection process which timing is in accordance with the changed driving method. This allows the detection section 21 to carry out the detection process at a timing suitable for the driving method changed by the timing control section 15.

Further, the present embodiment has described an example case in which the detection section control section 22 sets a detection period according to the driving method of the display device 1, but the present invention is not limited to this. For example, it is possible to employ an arrangement in which the display device 1 includes a storage section (not shown) in which data respectively indicative of detection periods corresponding to respective driving methods are stored in advance, and the detection section control section 22 reads out, from the storage section, data indicative of a detection period corresponding to the driving method of the display device 1 changed by the timing control section 15.

Further, the detection section control section 22 in accordance with the present embodiment may determine, on the basis of a combination of the line polarity signal and the frame polarity signal, which driving method a current driving method is. In this case, the detection section control section 22 can generate a detection sync signal suitable for the driving method determined by the combination of the line polarity signal and the frame polarity signal.

According to this arrangement, the timing control section 15 can generate a detection sync signal suitable for the current driving method, even in a case where the timing control section 15 does not know which driving method the current driving method is.

[TFT Characteristic of TFT in which Oxide Semiconductor is Used]

Although the TFT included in the display panel 11 is not particularly limited in the embodiments described above, the TFT can be a TFT that includes a semiconductor layer made of what is called an oxide semiconductor. Examples of the oxide semiconductor encompass IGZO (InGaZnOx).

Figure 11:
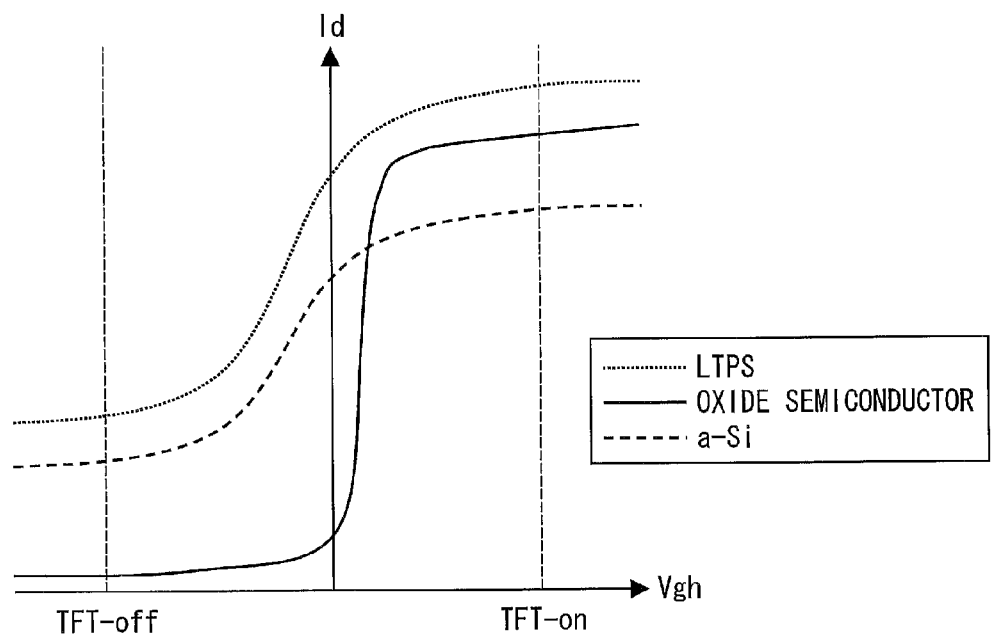
FIG. 11 is a graph showing a characteristic of a TFT constituted by an oxide semiconductor, a characteristic of a TFT constituted by a-Si, and a characteristic of a TFT constituted by LTPS in the display device in accordance with each embodiment of the present invention.

The following will describe, with reference to FIG. 11, TFT characteristics observed in a case where an oxide semiconductor is used as the TFT. FIG. 11 is a view showing characteristics of various TFTs. Specifically, FIG. 11 shows a characteristic of the TFT constituted by the oxide semiconductor, a characteristic of a TFT constituted by a-Si (amorphous silicon), and a characteristic of a TFT constituted by LTPS (Low Temperature Poly Silicon).

In FIG. 11, a horizontal axis (Vgh) indicates a value of an ON voltage supplied to a gate of each of the TFTs, and a vertical axis (Id) indicates an amount of an electric current between a source and a drain of each of the TFTs.

Specifically, a period indicated as 'TFT-on' in FIG. 11 represents a period in which each of the TFTs is in an ON state in accordance with the value of the ON voltage, and a period indicated as 'TFT-off' in FIG. 11 represents a period in which each of the TFTs is in an OFF state in accordance with the value of the ON voltage.

As shown in FIG. 11, the electron mobility at the time of an ON state is 20 to 50 times higher in the TFT constituted by the oxide semiconductor than in the TFT constituted by a-Si, and the TFT constituted by the oxide semiconductor thus has an excellent ON characteristic. As such, a refresh rate of the TFT constituted by the oxide semiconductor can easily be increased (e.g., to not lower than 60 Hz, etc.).

The display panel 11 included in each of the display drive devices 10 and 10' in accordance with the above-described embodiments employs, for each pixel, the TFT constituted by the oxide semiconductor and having the excellent ON characteristic. Accordingly, the display panel 11 can drive each pixel by use of the TFT smaller in size. This allows the display panel 11 to achieve a reduction in ratio of an area occupied by the TFT in each pixel. That is, it becomes possible to increase an aperture ratio in each pixel, thereby increasing optical transmittance of backlight. This allows employing a backlight device with low power consumption as well as suppressing luminance of the backlight device. Consequently, a reduction in power consumption is achieved.

Further, since the TFT has the excellent ON characteristic, time required to write a source signal into each pixel can be shortened. This allows easily increasing a refresh rate of the display panel 11.

Further, as shown in FIG. 11, the leak current at the time of an OFF state of the TFT constituted by the oxide semiconductor is approximately 1/100 of the leak current at the time of an OFF state of the TFT constituted by a-Si. The TFT constituted by the oxide semiconductor thus has an excellent OFF characteristic with almost no leak current. Due to the excellent OFF characteristic, the refresh rate of the TFT constituted by the oxide semiconductor can easily be reduced (e.g., to not higher than 30 Hz, etc.).

By employing, for each pixel, the TFT constituted by the oxide semiconductor and having the excellent OFF characteristic, the display panel 11 in accordance with each of the above-described embodiments can maintain, for a long time, a state in which a source signal is written in each of the plurality of pixels included in the display panel 11. This allows the refresh rate of the display panel 11 to be reduced easily.

CONCLUSION

As described above, a display device in accordance with Aspect 1 of the present invention is a display device including: a display driving device displaying an image; and an input detection device detecting an approach or a contact of an object to the display driving device, the display driving device including: a display panel including (i) a plurality of scanning lines, (ii) a plurality of image signal lines intersecting with the plurality of scanning lines, (iii) a pixel electrode connected to each of the plurality of image signal lines, and (iv) a common electrode facing the pixel electrode; a scanning line driving circuit sequentially supplying a scanning signal to the plurality of scanning lines; and a signal line driving circuit sequentially supplying an image signal to the plurality of image signal lines, a constant voltage being applied to the common electrode at least in a scanning period in which the scanning signal is supplied to the plurality of scanning lines, the input detection device including a detection panel which is provided along the display panel and detects the approach or the contact of the object, the detection panel detecting the approach or the contact of the object in a detection possible period which (i) is a period from a time point when supply of the scanning signal to an m-th (m is a natural number) scanning line is started to a time point when supply of the scanning signal to an (m+1)-th scanning line is started but (ii) excludes a rising period of the image signal supplied to the plurality of image signal lines.

According to the above arrangement, the input detection device detects a contact or an approach of an abject in a period other than a rising period of the image signal supplied to the pixel electrode via a corresponding image signal line. According to this, the display device can detect a contact or an approach of the object in a period with stable noise excluding the rising period in which noise is generated due to a rise of the image signal supplied to the pixel electrode via the image signal line.

This allows the display device to secure a longer detection period for detecting the input operation at the detection panel, and obtain high detection accuracy, accordingly. Further, the display device can have a high S/N ratio, and can obtain high detection accuracy, accordingly.

Note that the 'rising period' refers to a period in which the image signal supplied to the pixel electrode rises or a period in which the image signal supplied to the pixel electrode falls.

Further, a display device in accordance with Aspect 2 of the present invention preferably has the same arrangement as that of Aspect 1, except that the period from the time point when supply of the scanning signal to the m-th (m is a natural number) scanning line is started to the time point when supply of the scanning signal to the (m+1)-th scanning line is started includes the scanning period and a horizontal flyback period.

Further, a display device in accordance with Aspect 3 of the present invention preferably has an arrangement which is the same as that of Aspect 1 or 2, except that the display driving device further includes sync signal supply means for supplying, to the detection panel, a sync signal indicative of a start timing of the detection possible period, and the detection panel starts, in synchronization with the sync signal, detection of the approach or the contact of the object.

According to the arrangement, the detection panel starts detecting the approach or the contact of the object in the detection possible period indicated by the sync signal supplied from the sync signal supply means. This allows the detection panel to detect the approach or the contact of the object in a period in which little influence is given from noise generated in the display driving device. This allows the detection panel to have high detection accuracy.

Further, a display device in accordance with Aspect 4 of the present invention preferably has an arrangement which is the same as that of Aspect 3, except that the display device further includes control means for changing a driving method of the display driving device, the sync signal supply means outputting a sync signal indicative of a start timing of the detection possible period which start timing is in accordance with the driving method changed by the control means.

According to the arrangement, the detection panel can detect the approach or the contact of the object in a detection possible period suitable for the driving method changed by the control means. This allows the detection panel to have high detection accuracy.

Further, a display device in accordance with Aspect 5 of the present invention preferably has an arrangement which is the same as that of Aspect 1 or 2, except that the display device further includes control means for changing a driving method of the display driving device, the detection panel detecting the approach or the contact of the object in a detection possible period which is in accordance with the driving method changed by the control means.

According to the arrangement, the detection panel can carry out the detection process in a period in which little influence is given from noise generated in the display driving device, and can detect the approach or the contact of the object in a detection possible period suitable for the driving method changed by the control means. This allows the detection panel to have high detection accuracy.

Further, a display device in accordance with Aspect 6 of the present invention preferably has an arrangement which is the same as that of Aspect 4 or 5, except that the driving method changed by the control means is always reverse polarity driving.

According to the arrangement, the display driving device can be driven by use of reverse polarity driving. This makes it possible to obtain high detection accuracy while reducing image sticking of the display panel.

Further, a display device in accordance with Aspect 7 of the present invention has an arrangement which is the same as that of any one of Aspects 1 through 6, except that the display panel further includes a switching element which, by means of the scanning signal supplied to the plurality of scanning lines, switches on and off an electrical connection between the pixel electrode and an image signal line corresponding to the pixel electrode; and the switching element includes a semiconductor layer made of an oxide semiconductor.

According to the arrangement, since the switching element having the semiconductor layer made of the oxide semiconductor having an excellent ON characteristic and an excellent OFF characteristic is employed in the display device, a frame cycle, that is, a refresh rate can easily be changed.

Further, a display device in accordance with Aspect 8 of the present invention preferably has an arrangement which is the same as that of Aspect 7, except that the oxide semiconductor is IGZO.

Further, a display device in accordance with Aspect 9 of the present invention preferably has an arrangement which is the same as any one of Aspects 1 through 8, except that the display panel and the detection panel are formed so as to be in close contact with each other.

This makes it possible to reduce a thickness of the display device along a direction in which the display panel and the detection panel are stacked together.

Further, a display device in accordance with Aspect 10 of the present invention preferably has an arrangement which is the same as that of any one of Aspects 1 through 8, except that the display panel and the detection panel are integrally formed.

This allows a further reduction in thickness of the display device along the direction in which the display panel and the detection panel are stacked together. Furthermore, since the display panel and the detection panel do not have to be provided separately, the number of components of the display device can be reduced, so that a reduction in cost is achieved.

[Additional Matter]

The description has been given on the embodiments of the present invention. Note that the present invention is not limited to the above-described embodiments but allows various modifications within the scope of the claims. In other words, any embodiment derived from a combination of two or more technical means appropriately modified within the scope of the claims will also be included in the technical scope of the present invention.

Further, the modified example has described an example case in which the present invention is applied to a display device which employs, in each pixel, a TFT constituted by an oxide semiconductor. Note that the present invention is not limited to this, and can also be applied to a display device which employs, in each pixel, other TFTs such as a TFT constituted by a-Si, a TFT constituted by LTPS, or the like.

INDUSTRIAL APPLICABILITY

A display device in accordance with the present invention is suitably applicable to a television receiver, a personal computer, a car navigation system, a mobile phone, a smart phone, a tablet PC, a digital camera, a digital video camera, and the like.

REFERENCE SIGNS LIST

1, 2: DISPLAY DEVICE
10, 10': DISPLAY DRIVING DEVICE
11: DISPLAY PANEL
12: SCANNING LINE DRIVING CIRCUIT
13: SIGNAL LINE DRIVING CIRCUIT
14: COMMON ELECTRODE DRIVING CIRCUIT
15, 15': TIMING CONTROL SECTION (CONTROL MEANS)
16: POWER SUPPLY CIRCUIT
20, 20': INPUT DETECTION DEVICE
21: DETECTION SECTION (DETECTION PANEL)
22, 22': DETECTION SECTION CONTROL SECTION
30, 30': SYSTEM-SIDE CONTROL SECTION
151, 151': DETECTION SYNC SIGNAL GENERATING SECTION (SYNC SIGNAL SUPPLY MEANS)

The invention claimed is:
1. A display device comprising:
a display driving device displaying an image; and
an input detection device detecting an approach or a contact of an object to the display driving device,
the display driving device including:
a display panel including (i) a plurality of scanning lines, (ii) a plurality of image signal lines intersecting with the plurality of scanning lines, (iii) a pixel electrode connected to each of the plurality of image signal lines, and (iv) a common electrode facing the pixel electrode;

a scanning line driving circuit sequentially supplying a scanning signal to the plurality of scanning lines; and a signal line driving circuit sequentially supplying an image signal to the plurality of image signal lines, a constant voltage being applied to the common electrode at least in a scanning period in which the scanning signal is supplied to the plurality of scanning lines, the input detection device including a detection panel which is provided along the display panel and detects the approach or the contact of the object, a horizontal sync period from a time point when the supply of the scanning signal to the m-th (m is a natural number) scanning line is started to a time point when the supply of the scanning signal to the (m+1)-th scanning line is started includes the scanning period and a horizontal flyback period, the detection panel detecting the approach or the contact of the object in a detection possible period which (i) is the horizontal sync period but (ii) excludes a rising period of the image signal supplied to the plurality of image signal lines, within a frame, the rising period of odd-numbered horizontal sync periods differs from the rising period of even-numbered horizontal sync periods.

2. The display device as set forth in claim 1, wherein:
the display driving device further includes sync signal supply means for supplying, to the detection panel, a sync signal indicative of a start timing of the detection possible period; and
the detection panel starts, in synchronization with the sync signal, detection of the approach or the contact of the object.

3. The display device as set forth in claim 2, further comprising control means for changing a driving method of the display driving device,
the sync signal supply means outputting a sync signal indicative of a start timing of the detection possible period which start timing is in accordance with the driving method changed by the control means.

4. The display device as set forth in claim 3, wherein:
the driving method changed by the control means is always reverse polarity driving.

5. The display device as set forth in claim 1, further comprising control means for changing a driving method of the display driving device,
the detection panel detecting the approach or the contact of the object in a detection possible period which is in accordance with the driving method changed by the control means.

6. The display device as set forth in claim 1, wherein:
the display panel further includes a switching element which, by the scanning signal supplied to the plurality of scanning lines, switches on and off an electrical connection between the pixel electrode and an image signal line corresponding to the pixel electrode; and
the switching element includes a semiconductor layer made of an oxide semiconductor.

7. The display device as set forth in claim 6, wherein the oxide semiconductor is IGZO.

8. The display device as set forth in claim 1, wherein the display panel and the detection panel are formed so as to be in close contact with each other.

9. The display device as set forth in claim 1, wherein the display panel and the detection panel are integrally formed.

10. The display device as set forth in claim 1, further comprising a timing controller that supplies, to the detection panel, a sync signal indicative of a start timing of the detection possible period; wherein
the detection panel starts, in synchronization with the sync signal, detecting the approach or the contact of the object.

11. The display device as set forth in claim 10, wherein the timing controller:
changes a driving method of the display driving device; and
outputs the sync signal indicative of the start timing of the detection possible period in accordance with the changing of the driving method.

12. The display device as set forth in claim 10, wherein:
the timing controller changes a driving method of the display driving device; and
the detection panel detects the approach or the contact of the object in the detection possible period in accordance with the changing of the driving method.

13. The display device as set forth in claim 11, wherein:
the driving method changed by the timing controller is reverse polarity driving.

* * * * *